United States Patent
Sognefest et al.

[15] 3,648,057
[45] Mar. 7, 1972

[54] VEHICULAR PLEX-PATH CIRCUMFERENTIAL CONTROL AND DISTRIBUTION SYSTEM

[72] Inventors: Peter W. Sognefest, Glenshaw; Bay E. Estes, III, Murrysville, both of Pa.

[73] Assignee: Essex-International Inc.

[22] Filed: Aug. 17, 1970

[21] Appl. No.: 64,282

[52] U.S. Cl. .................................................307/10 R, 340/172
[51] Int. Cl. .......................................................................H02j 1/08
[58] Field of Search ..............307/10; 315/312; 340/172, 168, 340/169

[56] References Cited

UNITED STATES PATENTS

| | | | |
|---|---|---|---|
| 3,544,803 | 12/1970 | Taylor | 307/10 R |
| 3,168,722 | 2/1965 | Sanders | 340/172 |
| 3,525,875 | 8/1970 | Ziomek | 307/10 R |

Primary Examiner—R. F. Staubly
Assistant Examiner—J. G. Smith
Attorney—Molinare, Allegretti, Newitt & Witcoff

[57] ABSTRACT

The disclosure describes an electrical control system for controlling essentially every function of a vehicle. In a preferred embodiment, the invention comprises a single harness formed of an electrical signal transmission path and an electrical power transmission path connected to a source of electrical power, control means for applying coded control signals to the electrical signal transmission path, and receiving means connected to the electrical signal and power transmission paths for receiving said coded electrical signals to selectively activate electrical switching means to operate desired load devices for performing selected vehicle functions.

3 Claims, 6 Drawing Figures

INVENTORS
BAY E. ESTES III &
PETER W. SOGNEFEST
BY Molinare, Allegretti,
Newitt & Witcoff
ATTORNEYS

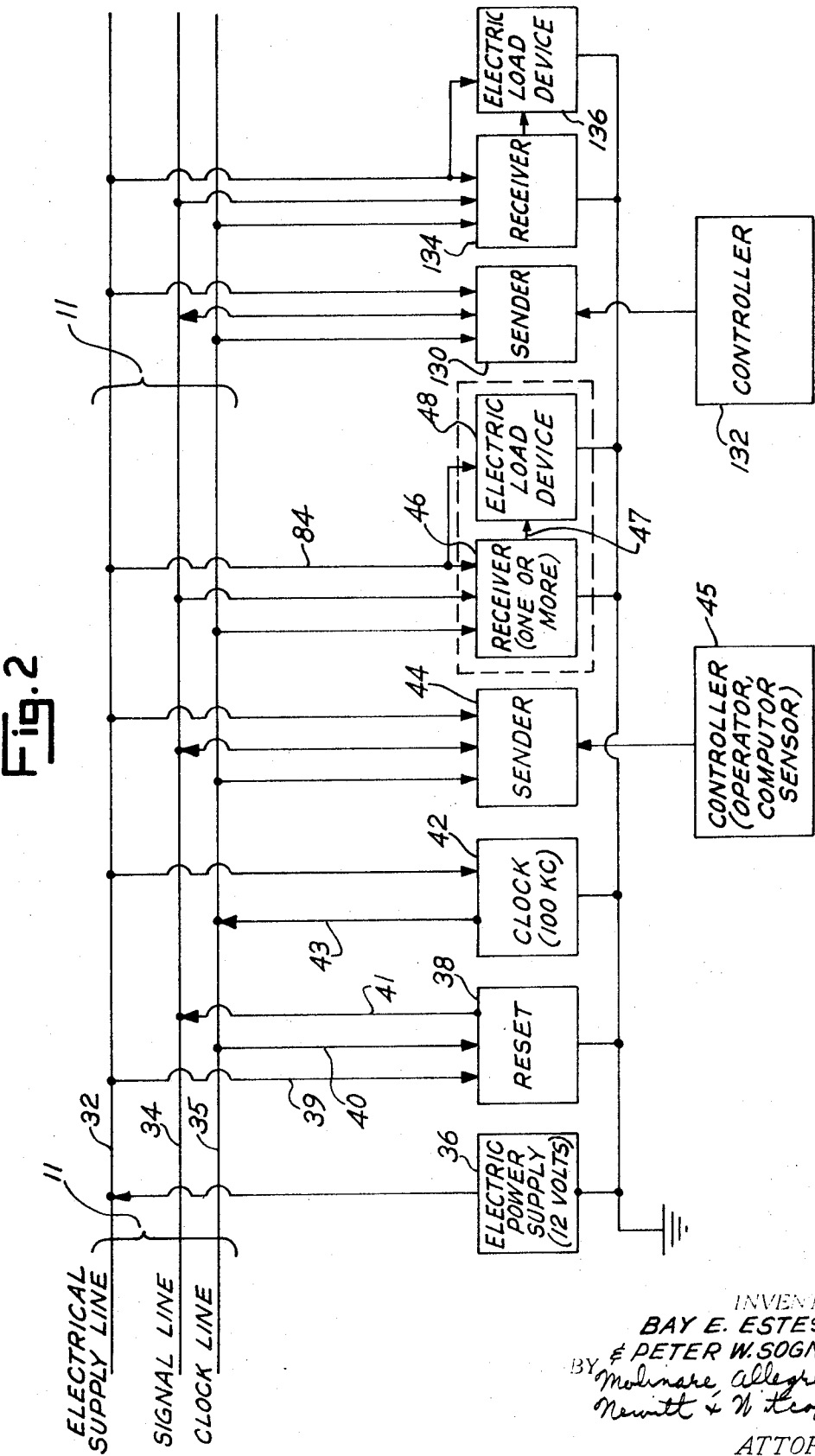

Patented March 7, 1972  3,648,057
4 Sheets-Sheet 3
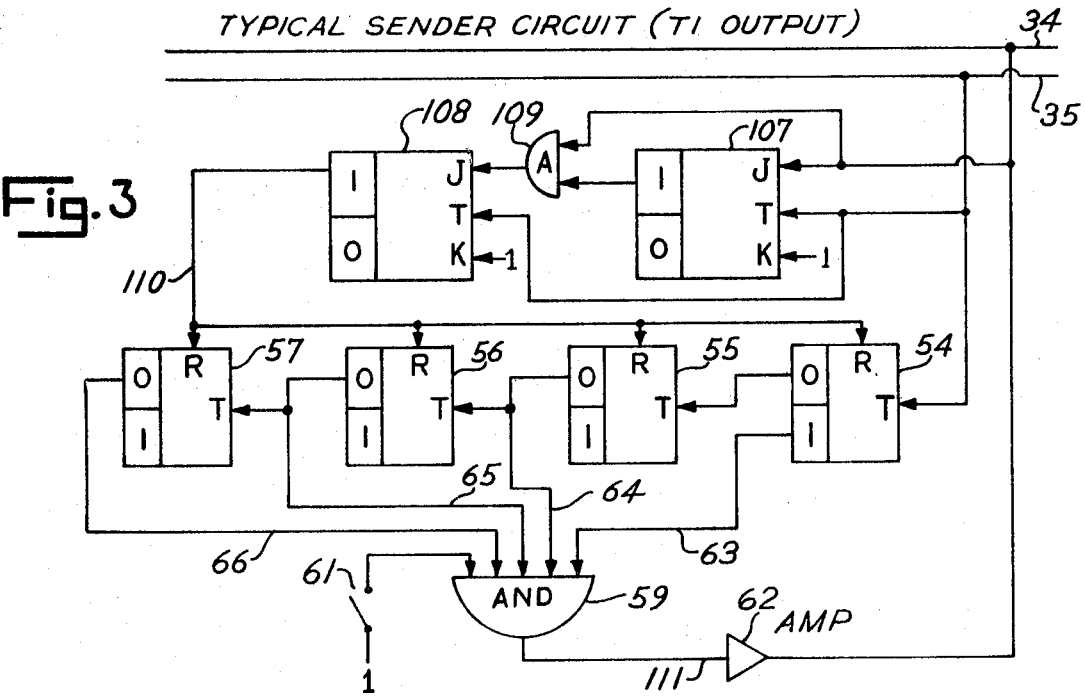
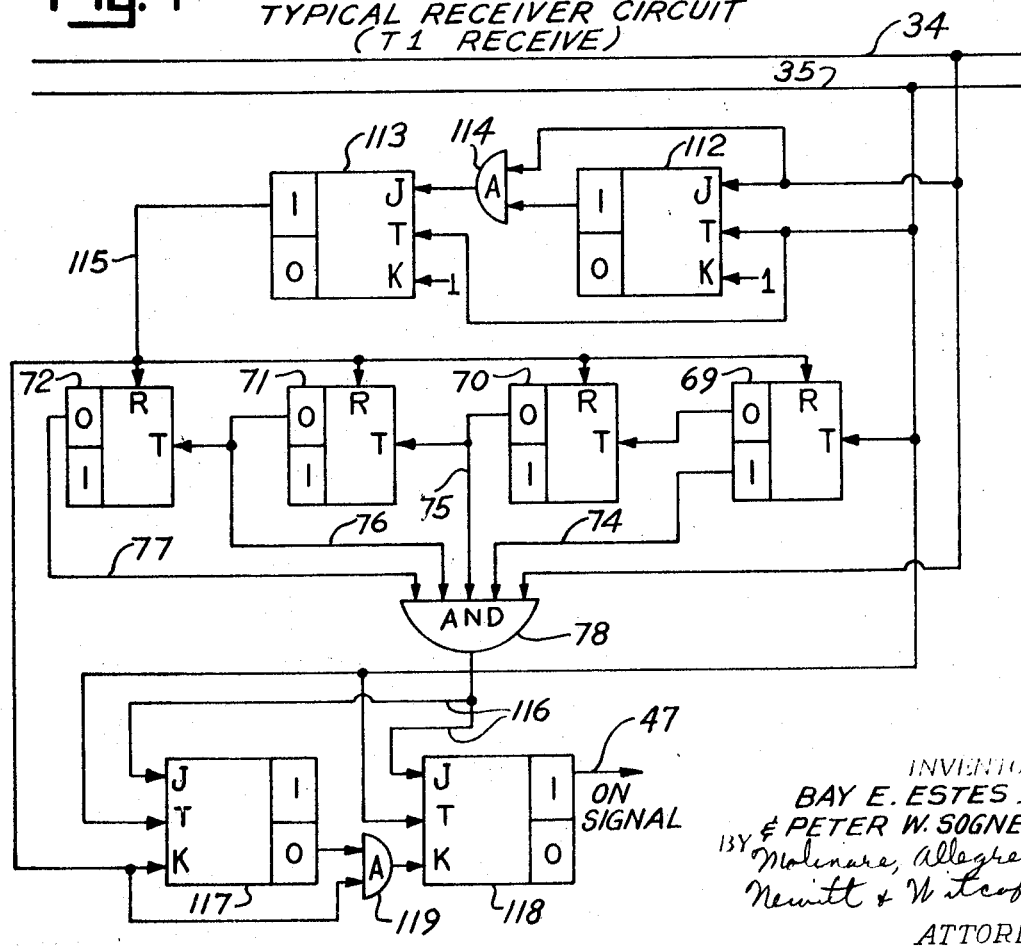
INVENTORS
BAY E. ESTES III
& PETER W. SOGNEFEST
BY Molinare, Allegretti,
Newitt & Witcoff
ATTORNEYS Patented March 7, 1972 3,648,057
4 Sheets-Sheet 4
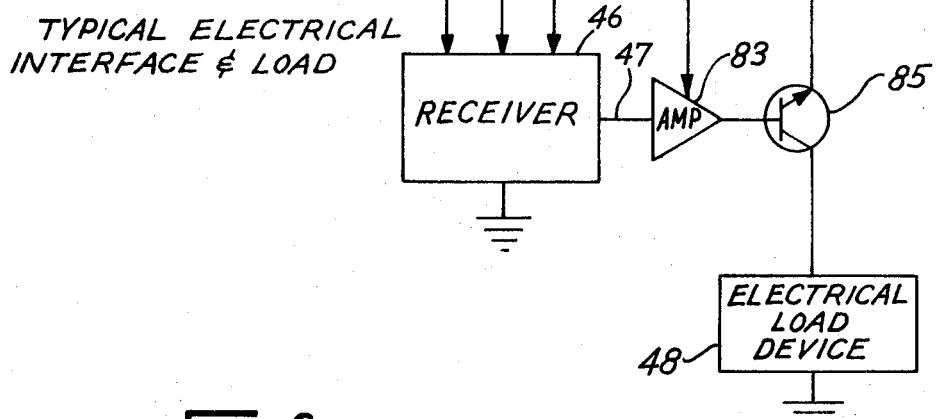
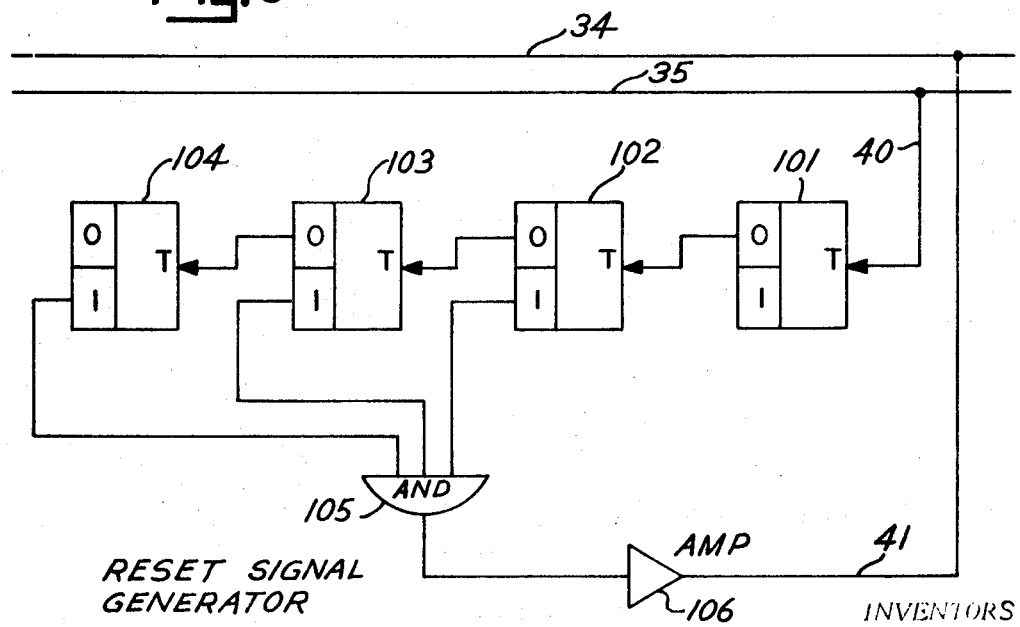
INVENTORS
BAY E. ESTES III
& PETER W. SOGNEFEST
BY Molinare, Allegretti,
Newitt & Witcoff
ATTORNEYS

VEHICULAR PLEX-PATH CIRCUMFERENTIAL CONTROL AND DISTRIBUTION SYSTEM

RELATED APPLICATION

The present invention was disclosed but not claimed in U.S. patent application Ser. No. 799,406 entitled "Plex-Path Circumferential Energy Control and Distribution System" filed Feb. 14, 1969, in the names of the present applicants and Ralph G. Nedbal of Pittsburgh, Pennsylvania. The invention claimed herein was completed prior to the invention claimed in U.S. patent application Ser. No. 799,406, now U. S. Pat. No. 3,564,280.

BACKGROUND OF THE INVENTION

The electrical wiring systems in many modern vehicles, such as automobiles, have been developed over the years in a brute force fashion wherein an increase in the number of power operated devices used in the vehicle has been achieved primarily by the expedient of adding more wires and switches to the existing electrical harness. Manifestly, this approach, with its large number of connections and its high complexity, has not resulted in the most efficient and reliable type of system.

Furthermore, such systems are difficult to diagnose when a failure occurs. At the same time, the replacement of parts often is made more difficult because of the great number of wires present in the system. Those skilled in the art know that a substantial percentage of the problems arising in automobiles today are due to electrical system failures.

Certain highly specialized arrangements for simplifying the wiring of vehicles, such as airplanes, have been attempted in the past. One such system is described in U.S. Pat. No. 3,458,759 issued July 29, 1969, in the name of W. L. Chase. However, each of these systems has exhibited certain deficiencies that have limited its overall usefulness. For example, the Chase system employs switch control modules and light control modules that must be serially connected in a precise position relative to each other in order to properly operate. Moreover, these modules must be operated by three separate voltage levels and require capacitive timing elements in the remote receiving modules (i.e., the light control modules).

These operating characteristics create a number of problems. The wiring and assembly of the system is made difficult by the requirement for the placement of modules in a particular order. Moreover, the requirement of multilevel signals complicates the circuitry and decreases the noise rejection characteristics. In addition, the requirements of capacitive timing circuits in the receiving modules creates reliability problems and drastically increases the overall expense of such circuits.

SUMMARY OF THE INVENTION

The present invention therefore has as its principal object the provision of an improved electrical control system for vehicles which overcomes the defects of prior electrical harnesses and which is characterized by better assembly procedure, high system reliability, simplified trouble diagnosis and simplified replacement procedures.

In a preferred embodiment, the invention takes the form of a harness which advantageously may be positioned around the vehicle and to which logic and control modules may be connected for controlling components and load devices hat affect every function of the vehicle, such as lighting, comfort, transmission, ignition, power assist, air-fuel, and the like. The harness comprises electrical transmission paths for transmitting control signals, timing signals, and electrical power between the electrical power source, the logic and control modules, and the load devices to effect the desired automotive functions.

The harness can be formed of a plurality of electrical wires, the basic requirement being that the harness must be capable of providing electrical transmission paths within the vehicle. In a preferred exemplary embodiment, as disclosed in greater detail herein, a three-path harness having three electrical wires is utilized. Two of the wires carry electrical timing and control signal information, and the third wire carries electrical power. All timed sequential coded information is transmitted over two of the wires to various sender and receiver modules connected to the harness. When the correct code is recognized by the receiver module or modules to be selected, the load devices associated with the selected modules are activated to perform the desired function. Each receiver module has an integrated circuit with an associated electric power amplifier or an electrical relay or a combination of the two. The integrated circuit selected by the coded signal permits the electric power from the harness to be applied to the load device. The electric power can be utilized to provide electric energy to various electrical loads, such as electric motors or lights, and to actuate fluid loads, such as hydraulic power servos in the transmission and mode selection doors in the comfort system. A control and distribution system made in accordance with the present invention offers a number of advantages. Firstly, both the sending and receiving modules can be placed anywhere along the harness and in any order. This feature greatly simplifies the assembly of the vehicular wiring system and enables two receiver modules to operate simultaneously (e.g., the modules which operate the parking lights or head lights). Moreover, by using the unique resetting circuitry described herein, no timing or capacitive circuit elements are required in the receiver modules. This feature enables reliable and inexpensive integrated circuits to be used throughout. In addition to the foregoing advantages, the circuits described herein will operate on only two signal levels, even for the resetting operation, thus eliminating the need for expensive diodes and increasing the noise rejection characteristics of the overall system.

The various objects, advantages and features of the invention are more clearly set forth in the detailed description of the preferred embodiment which follows.

BRIEF DESCRIPTION OF THE DRAWINGS

In a detailed description which follows, reference will be made to the drawings in which:

FIG. 2 is a schematic, circuit diagram showing a preferred embodiment of a harness connected to the various power, control and receiver modules in accordance with the invention;

FIG. 3 is a schematic circuit diagram of a typical sender module;

FIG. 4 is a schematic diagram of a typical receiver module;

FIG. 5 schematically illustrates a typical electrical interface and load circuit; and FIG. 6 schematically illustrates a typical reset signal generator in accordance with a preferred embodiment of the invention.

DESCRIPTION OF THE PREFERRED EMBODIMENT

Figure 1:
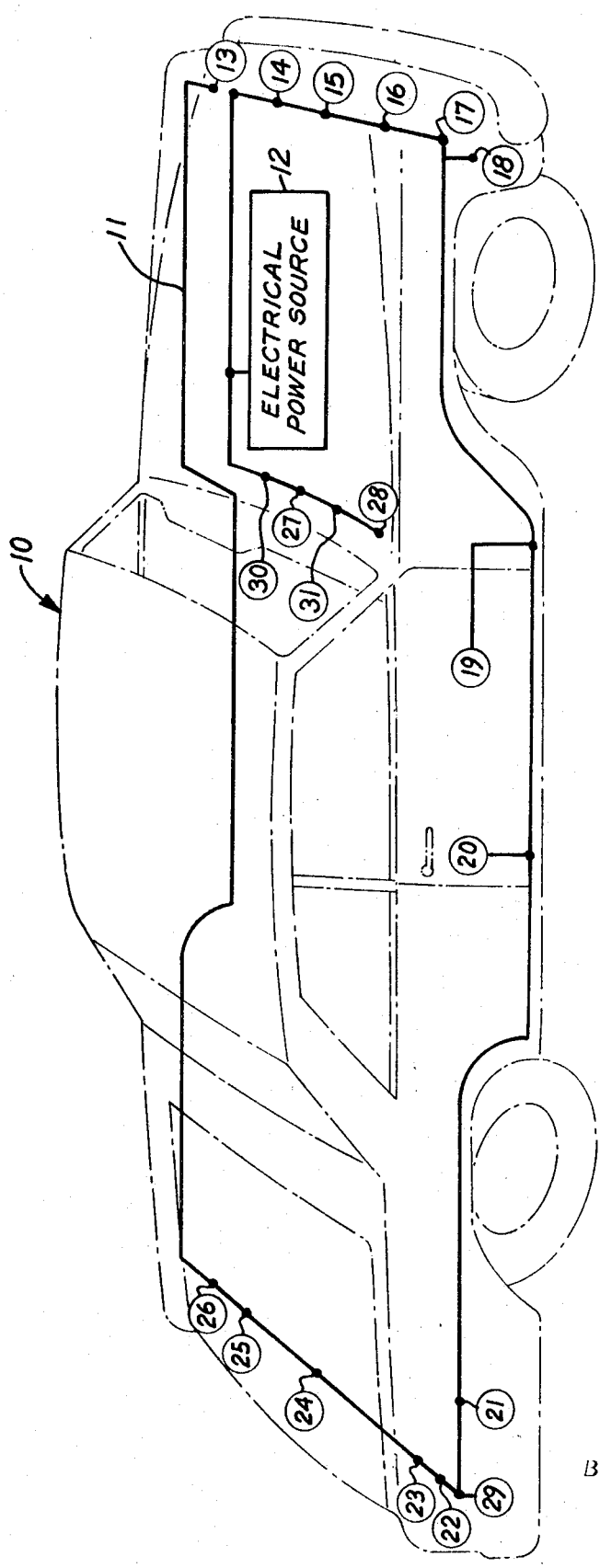
FIG. 1 is a pictorial view of the invention as embodied in an automotive vehicle.

Referring now to the drawings, and more particularly to FIG. 1, there is illustrated an automotive vehicle embodying an exemplary form of the inventive electric control system.

The vehicle 10 has a harness 11 positioned about its periphery or circumference such that various power, control and receiver modules may be connected thereto at any desired location on the automobile. Thus, a power module 12 incorporating a source of electrical power can be located beneath the hood of the vehicle for connection to harness 11. Advantageously, in one embodiment of the invention, the electrical power source may comprise a 12-volt battery.

It further will be appreciated as the description of the invention proceeds that it is not intended to limit the use of the system to any particular number of electrical devices and that the illustrative load devices shown in FIG. 1 and described herein are intended to be merely exemplary of the great utility and flexibility of the invention. Thus, other modules which may be connected to the harness 11, as illustrated in FIG. 1, include two headlight modules 13 and 17, two parking and turn-signal light modules 14 and 16, and a horn module 15, all located in their normal positions at the front of the vehicle. The harness also is shown as connected to a front side light module 18 at one fender, a window module 19 and a door lock module 20 at a side door location, and a rear side light module 21 and a fuel sensor module 29 at a rear fender location. At the rear of the automobile are brake light and turn signal modules 22 and 26, rear taillight modules 24 and 25, and a trunk lock module 24. In addition, for purposes of illustration, FIG. 1 shows a windshield wiper module 27 and a comfort module 28 connected to the harness 11 at a position forward of the dashboard, and a display module 30, together with a control or sender module 31, connected to harness 11 at the dashboard location. Manifestly, as the explanation of the invention proceeds, it will become clear that any desired number of electrically operated load devices may be controlled from the common harness 11 in accordance with the principles and teaching of the invention.

FIG. 2 illustrates the manner in which the modules may be connected to a common harness 11. In this example, harness 11 is formed of an electrical power transmission supply path or line 32, an information signal transmission path or line 34, and a timing signal transmission path or line 35.

A source of electrical power 36, such as a 12-volt battery or the like, is connected between ground (the chassis of the car is the ground of the system) and electrical supply line 32. Thus, the latter carries the electrical power to all other modules which may be connected to line 32 around the harness path.

A clock or timing module 42 is connected between the electrical supply line 32 and ground, and its output is supplied to the clock line 35 by means of a connector 43. The purpose of the clock module 42 is to supply two level timing pulses to all of the modules connected to the harness 11 so that their operations will all be synchronized from a common clock source. Advantageously, in a preferred embodiment of the invention, the clock module 42 comprises an oscillator or pulse generator of any suitable construction which is capable of providing time-spaced output pulses at a frequency of 100,000 cycles per second. The time-spaced pulses define counting states which occur in cycles due to the operation of a reset signal generator described hereafter.

FIG. 6 is a schematic diagram of a reset signal generator 38 which supplies a coded signal through a connection line 41 to signal line 34 for the purpose of resetting all sender and receiver modules. In this illustrative embodiment, the reset signal generator consists of a four-bit binary counter, formed of trigger flip-flop stages 101, 102 103 and 104, an AND-gate 105, and a line amplifier 106. The free-running (i.e., not reset) binary counter comprising flip-flops 101, 102, 103 and 104 is triggered by clock signals on line 35 through line 40. AND-gate 105 is connected to the one state outputs of all flip-flops in the counter except the lowest order flip-flop 101. AND-gate 105 is enabled for two consecutive clock states, which in this case are time counts 14 and 15 of each 16 step counting cycle.

Amplifier 106 transmits a signal onto signal line 34 through line 41 during these two consecutive clock states. This two-consecutive-clock-state signal forms the coded reset signal to be received by all sending and receiving units of the system. It should be noted that there must never be another similar signal for two consecutive clock states transmitted on signal line 34 during a counter cycle (in this illustrative case 16 clock states) since another such signal would look like a reset code to all the senders and receivers causing all to become reset without completing a whole counter cycle. By using two successive pulses to reset the receiver modules, no timing needs to be done in these modules and they can be made without using capacitors. Moreover, there is no need to use a third voltage level to reset the receiver modules.

Another module illustrated in FIG. 2 of the drawings, and described in greater detail below, is the sender module 44. The latter is connected to a suitable controller 45 which may take the form of a sensor, a computer, an operator, or any combination of the same. The purpose of the sender 44 is to transmit coded function selection signals throughout the harness 11, by means of the signal line 34, so that a selected module or modules will be activated to operate associated load devices for the performance of a desired function. Sender module 44 receives its operating power from the electrical supply line 32 and is synchronized with the remaining circuits by its connection to the clock line 35 and signal line 34.

As stated above, any number of receiver modules may be connected to harness 11, such that they may respond to their uniquely coded signals for the performance of an electrically operated function. The next module shown in FIG. 2 is representative of the receiver modules used for providing electrically actuated functions. Such a receiver module 46 is connected to electric supply line 32 to receive electrical operating power, to signal line 34 to receive coded information and reset signals and to clock line 35 to receive timing signals.

The output of receiver module 46 is connected over a conductor 47 to an electrical load device 48. The latter is connected between electrical supply line 32 in harness 11 and ground. If, for example, the signals transmitted over signal line 34 of harness 11 contain the code for which receiver module 46 has been set, then the receiver module supplies an output signal over conductor 47 to turn on electrical load device 48. Thus, if electrical load device 48 were the automobile horn, for example, the horn would be actuated whenever the properly coded signals corresponding to the receiver module 46 setting were transmitted down signal line 34.

FIG. 3 illustrates a schematic diagram of a typical sender circuit which can be attached to harness 11 to provide coded signal information so that desired receiver modules can be selected and operated. As shown in FIG. 3, the sender circuit comprises a binary counter formed of the flip-flop stages 54, 55, 56 and 57, a reset circuit comprising flip-flops 107, 108, AND-gate 109, and an amplifier 62. Those skilled in the art are thoroughly familiar with the various forms which such binary counters can take in actual practice and, therefore, the binary counter stages are shown in block form only. Each flip-flop stage of the binary counter is capable of being switched to either one of two states, such states representing the digits 0 and 1, respectively. Although the binary counter illustrated in FIG. 3 comprises four stages capable of achieving a count up to 16, it will be understood that a larger or smaller number of flip-flop stages may be utilized, as desired. The binary counters described herein preferably comprise integrated circuits.

Two J-K flip-flops 107 and 108, and AND-gate 109 comprise the reset circuit which responds to the reset code generated in the reset signal generator and transmitted on the signal line 34. The reset code from signal line 34, which comprises a pulse signal for two consecutive clock states, enters the J-input of flip-flop 107, causing flip-flop 107 to be set to its 1 state upon the arrival of the next clock pulse on clock line 35. The output of flip-flop 107 and the signal from signal line 34 are fed into AND-GATE 109. The output of AND-gate 109 is connected to the J-input of flip-flop 108. If flip-flop 107 is set to its 1 state and there is a signal on line 34 (the case during the second consecutive signal on line 34), flip-flop 108 is set upon the arrival of the next clock pulse. The output from flip-flop 108 is connected through line 110 to all reset inputs (R) of counter flip-flops 54, 55, 56 and 57. These counter flip-flops are reset to their zero states whenever flip-flop 108 is set to its 1 state.

It will be noted that the J-K flip-flops 107 and 108 are provided with a K-input as well as the J-input and the clock T-input. As shown in FIG. 3, the K-input is permanently connected to a 1 signal source. Thus, whenever a 1 is applied to a J-input, the flip-flop changes to a 1 state when a clock pulse is applied to the T-input and changes back to 0 state at the next following clock pulse on the T-input, even if the 1 remains at the J-input during the second clock pulse. It can be seen that the J-K flip-flops are always reset by changing to a 0 state on the clock pulse following the clock pulse that set the flip-flop to the 1 state. The operation of such J-K flip-flops is well-known, as described in the publication entitled USING MRTL I/C FLIP-FLOPS by Motorola Semiconductor Products Inc. dated Sept. 1966.

After being reset, the counter flip-flop stages begin counting clock pulses received from line 35. The selective outputs of the flip-flop counter stages are connected to AND-gate 59 along with a line from switch 61. If switch 61 is closed (those skilled in the art will appreciate that switch 61 can take the form of an electrical output from a computer or controller) and there is a coincidence of inputs to AND-gate 59 from the counter, there will be an output from the AND-gate on line 111 to amplifier 62. Amplifier 62 transmits the AND-gate output to the signal line 34. In FIG. 3, the output from AND-gate 59 would occur during counter count 1 (i.e., time T1) during each clock cycle. Thus, the sender circuit generates a series of two-level information pulses, each of the pulses occurring during a particular counting state in each clock cycle. The clock pulses and information pulses together form control signals that allow the receiver modules to be selectively operated. Since the sender circuit receives all clock pulses, it can be placed anywhere along the harness. Other sending modules may send outputs at different counter states. Furthermore, it is fully within the principles of the invention that there may be several sending modules at the same counter state in the event control from more than one location is desired.

In a manner to be described in greater detail below, the receiver modules which have been coded to respond to a T1 signal are activated to actuate their primary load devices and thereby provide the desired circuit function. For example, if the automobile headlights are controlled by a receiver module coded to respond to the T1 signal, then the closing of switch 61 in the sender circuit—either by the automobile driver, the computer, or by a sensor element such as a photocell—will result in the headlights being turned on. Although all of the receiver modules are connected to harness 11 and will receive the transmitted T1 signal, only those modules which have been coded to respond to the signal will be actuated. The remaining modules will remain inactive.

FIG. 4 illustrates a typical receiver module circuit which is adapted to be connected harness 11 to receive the coded control signals required for the actuation of the module in order to effect a desired function. As shown in FIG. 4, the receiver circuit comprises a reset circuit, a binary counter formed of a plurality of flip-flop stages, and an AND gate all arranged in a manner similar to the typical sender module shown in FIG. 3 of the drawings.

In addition, an On-Off circuit composed of two J-K flip-flops and an AND gate is provided to store the fact that the module has received its coded control signal.

The reset circuit comprising flip-flops 112, 113, and AND-gate 114, functions in an identical manner to the reset circuit of FIG. 3 to reset flip-flops 69, 70, 71 and 72.

The reset circuit is connected to receive reset signals from signal line 34 and timing signals from clock line 35 so that the counter will be reset in a cyclic manner in synchronism with all other sender and receiver counters.

For purposes of illustration, the binary counter flip-flops comprise a four-bit counter with an output lead 74 being connected to the 1 state output of flip-flop 69 and output leads 75, 76 and 77 being connected to the 0 state outputs of flip-flops 70, 71 and 72, respectively. Thus, the typical receiver circuit of FIG. 4 is shown, for purposes of illustration, as a receiver which is connected to respond only to a T1 signal pulse on signal line 34, since there will be an output on all of the output leads 74, 75, 76 and 77 only at time T1 in the counting cycle. Each of these output leads is connected to AND-gate 78, and at the time T1 only, the AND gate is permitted to transmit a signal from the signal 34. It now is clear that when a T1 pulse is transmitted on signal line 34, and only at this time, AND-gate 78 will provide an output on line 116 to the J-inputs of J-K flip-flops 117 and 118. Flip-flops 117 and 118 will be set to their 1 state by the occurrence of a clock pulse (in this case a T2 clock pulse) if there is a signal on line 116 during counting state T1. An ON signal will appear on line 47 on the output of flip-flop 118 to be used to actuate an associated component or load device. Flip-flop 118 will not be reset to its 0 state unless there is an input to its K-input from the output of AND-gate 119. AND-gate 119 receives its inputs from reset signal line 115 and from the 0 output of flip-flop 117. Flip-flop 117 receives a signal from reset line 115 and its K-input, and is thus reset to zero, if it were in a 1 state, by the clock pulse that follows the reset signal. AND-gate 119 would not be enabled during these times since flip-flop 117 is not reset to its 0 state until after the reset signal has occurred. (Note that flip-flop 113 and flip-flop 117 change from their 1 to 0 states on the same clock pulse. Even though there is a possibility of AND-gate 119 being enabled for an instant because of differences in switching times in flip-flops 113 and 117, flip-flop 118 cannot possibly switch, since the clock pulse has already entered its trigger input.) If, however, there is no signal during counting state T1 on line 116 and flip-flop 117 does not become set to its 1 state i.e., it stays in its 0 state), AND-gate 119 will be enabled when there is a reset signal on line 115. Flip-flop 118 will then be reset to its 0 state on the next clock pulse. This will turn the ON signal on line 47 off. Therefore, the associated load device will be turned off at this time.

While the construction and operation of the typical sender and receiver circuits of FIGS. 3 and 4 have been described in connection with a T1 signal count, it will be apparent to those skilled in the art that such sender and receiver circuits may be coded for other signal codes such that a number of receiver modules can be connected to any point on the harness 11 for operating their associated load devices at desired times. For example, another sender module 130 and a controller 132 may also be connected to lines 32, 34 and 35 to activate a receiver module 134 that controls an electrical component 136. Since each receiver module receives all clock pulses and coded information pulses, all of the modules can be connected to any location on a common harness, but the coding of the signals permits the selected actuation of only the desired modules associated with the functions to be performed.

In accordance with a feature of the present invention, a selection of a receiver module, in the manner described above, permits the actuation of an electrically powered load device or component. FIG. 5 of the drawings illustrates an exemplary interface for such a load.

When the receiver module shown in FIG. 5 is turned on by a properly coded signal from signal line 34, the output signal on conductor 47 is amplified by an amplifier 83. The amplified output signal turns on a transistor 85, or some other switching device, such as a relay. Amplifier 83 and transistor 85 each receive electrical power from the electrical supply line 32 by means of leads 84, as does receiver 46. When transistor 85 is turned on, a circuit is completed from electrical supply line 32 to electrical load device 48 to actuate the latter and to enable it to perform its function.

In view of the complete description of the inventive electrical control system given above, in conjunction with the illustrative modules shown in the drawings, those skilled in the art now will appreciate that a single harness having electrical transmission paths can be used to control essentially every desired function in the automotive system. These principles not only provide a control system having higher system reliability than presently existing electrical harnesses but, in addition, greatly simplify trouble diagnosis. A simple connection can be made at any point in the harness to permit an external tester to check the entire system in a relatively short time. Still further, once the problem is known, a new module can be substituted for the defective module in a matter of minutes, thereby reducing repair time to a minimum.

It will be understood that the various embodiments of the invention which have been described are merely illustrative of an application of the principles of the present invention.

Those skilled in the art will readily understand that numerous other embodiments and modifications may be made without departing from the true spirit and scope of the invention. In particular, many of the electrical components shown in separate modules herein may be assembled in a more central location on the vehicle.

What is claimed is:

1. In a system for controlling substantially all electrical components of a self-propelled vehicle comprising a source of electrical power, improved apparatus comprising:

a harness comprising an electrical power transmission path connected to said source of electrical power, a timing signal transmission path, and an information signal transmission path;

means for generating a series of time-spaced clock pulses having a predetermined polarity that define counting states which occur in cycles;

means for conducting said clock pulses on said timing signal transmission path;

means for receiving each of said clock pulses and for generating a first series of information pulses having said predetermined polarity, each of said information pulses occurring during a predetermined one of said counting states in each cycle;

means for transmitting said first series of information pulses over said information signal transmission path;

counting means connected to said information signal transmission path for counting information pulses, means for generating a first output signal in response to the counting of the first series of information pulses;

means for operating a first one of said components in response to said first output signal;

means for receiving each of said clock pulses and for generating a second series of information pulses having said predetermined polarity, each of said second series of information pulses occurring during another predetermined one of said counting states in each cycle;

means for transmitting said second series of information pulses over said information signal transmission path;

means for generating a second output signal in response to the counting of the second series of information pulses;

means for operating a second one of said components in response to said second output signal;

means for generating and transmitting over said information signal transmission path reset pulses having said predetermined polarity which are coincident with two consecutive clock pulses; and means for detecting said reset pulses and for generating a signal which resets said counting means.

2. Apparatus, as claimed in claim 1, wherein the means for detecting comprises:

first flip-flop means for producing one predetermined output state in response to a first reset pulse;

gate means for producing an output pulse in response to the one predetermined output state and a reset pulse; and second flip-flop means for producing a second predetermined output state in response to said output pulse from the gate means.

3. Apparatus, as claimed in claim 2, and further comprising apparatus for terminating the generating of the first output signal by the means for generating, said apparatus comprising:

third flip-flop means for producing one predetermined output state in response to the second predetermined output state;

second gate means for producing a second output pulse in response to the one predetermined output state of the second flip-flop means and the second predetermined output state; and fourth flip-flop means for terminating the first output signal in response to the second output pulse.

* * * * *